(12) United States Patent
Buesching (10) Patent No.: US 12,001,371 B2
(45) Date of Patent: Jun. 4, 2024

(54) CONNECTION OF INPUT AND / OR OUTPUT MODULES TO A FIELDBUS WITH A HIGHER-LEVEL CONTROLLER

(71) Applicant: WAGO Verwaltungsgesellschaft mbH, Minden (DE)

(72) Inventor: Dirk Buesching, Vlotho (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 17/690,820

(22) Filed: Mar. 9, 2022

(65) Prior Publication Data

US 2022/0292046 A1 Sep. 15, 2022

(30) Foreign Application Priority Data

Mar. 10, 2021 (DE) ...................... 10 2021 001 276.3

(51) Int. Cl.
| | |
|---|---|
| *G06F 13/42* | (2006.01) |
| *G05B 19/042* | (2006.01) |
| *G06F 13/20* | (2006.01) |
| *G06F 13/38* | (2006.01) |
| *G06F 13/40* | (2006.01) |

(52) U.S. Cl.
CPC .......... *G06F 13/4221* (2013.01); *G06F 13/20* (2013.01); *G06F 13/4022* (2013.01)

(58) Field of Classification Search
CPC .. G06F 13/4022; G06F 13/20; G06F 13/4221; G06F 13/4068; G06F 13/385; G05B 19/0423

USPC ........................................................ 710/313
See application file for complete search history.

(56) References Cited

U.S. PATENT DOCUMENTS

| | | | |
|---|---|---|---|
| 8,606,983 B2 * | 12/2013 | Hahn ........................ | H04L 1/24 710/306 |
| 10,007,633 B2 | 6/2018 | Kroner et al. | |
| 2010/0070748 A1 | 3/2010 | Duan et al. | |
| 2010/0241776 A1 * | 9/2010 | Bayerl .................. | G06F 11/221 710/260 |
| 2019/0268223 A1 * | 8/2019 | Meier ..................... | H04L 63/18 |

FOREIGN PATENT DOCUMENTS

| | | |
|---|---|---|
| DE | 19961478 A1 | 7/2001 |
| EP | 3014816 A1 | 5/2016 |

* cited by examiner

*Primary Examiner* — Chun Kuan Lee
(74) *Attorney, Agent, or Firm* — Muncy, Geissler, Olds & Lowe, P.C.

(57) ABSTRACT

An I/O module comprising an input interface, designed for connection to at least one sensor for input of an input signal, and/or an output interface, designed for connection to at least one actuator for output of an output signal, with a data interface for connection to a sub-bus for the transmission of an input datum and/or output datum, and with a control unit connected to the data interface and connected to the input interface and/or the output interface, wherein the control unit is set up to process the input datum and/or output datum and exchange it via the data interface, wherein the control unit is further set up to store a predetermined input value and/or output value which replaces the input datum and/or output datum.

9 Claims, 4 Drawing Sheets

CONNECTION OF INPUT AND / OR OUTPUT MODULES TO A FIELDBUS WITH A HIGHER-LEVEL CONTROLLER

This nonprovisional application claims priority under 35 U.S.C. § 119(a) to German Patent Application No. 10 2021 001 276.3, which was filed in Germany on Mar. 10, 2021, and which is herein incorporated by reference.

BACKGROUND OF THE INVENTION

Field of the Invention

The present invention relates to an automation system having a preferably decentralized device and a method for connection of the device. The invention also relates to a bus device, in particular an input/output module (I/O module) with a data interface.

Description of the Background Art

In order to check an automation system in the event of malfunction or an emergency, it was previously necessary to intervene in the system. To this end, for example, the operator would change the automation program so that an error message could be triggered. In this way, the automation system can be prompted to process the error message and thus, the reaction of the automation system can be tested.

From the prior art, publication US 2010/0070748 A1 is known. The publication describes a device that can be connected to a bus system instead of an I/O module and that outputs simulated data instead of actual measurement data.

DE 199 61 478 A1 discloses a fieldbus system in which a bus device, e.g., a transmitter, is directly connected to the fieldbus. The bus device is set up to output simulated status data, such as error messages, to the fieldbus via its data interface after receiving certain control instructions from the fieldbus. The simulated status data is previously transmitted by a control computer via the fieldbus. In this method, the control program of the control computer must also be modified in such a way that it first transmits the simulated status data to the bus device and then retrieves it at a suitable time.

From EP 3 014 816 A1, which corresponds to US 2016/0147695, for example, a method for operating a fieldbus coupler for connecting input and output modules is known, in which the fieldbus coupler in a diagnostic mode transmits a predetermined output value for the output channel of at least one input/output module via the sub-bus to the input/output module and/or assigns at least one specified input value to the at least one input/output module and outputs it via the fieldbus.

SUMMARY OF THE INVENTION

It is therefore an object of the present invention to provide an improved I/O module of an automation system and an improved operating method.

The I/O module according to an exemplary embodiment of the invention is designed with an input interface for connecting at least one sensor for the input of an input signal and/or with an output interface for connecting at least an actuator for the output of an output signal. The I/O module has a data interface for connection to a sub-bus for the transmission of an input datum and/or output datum.

The I/O module has a control unit connected to the data interface and connected to the input interface and/or the output interface.

The control unit is set up to process the input datum (ED) and/or the output datum (AD) and to exchange it via the data interface. The control unit is also set up to store a predetermined input value (EW) and/or output value (AW) which replaces the input datum (ED) and/or output datum (AD). The control unit is set up to receive a control value (SW) via the data interface and, based on the control value (SW), to switch to:

a first operating mode (normal mode)
to receive the output datum (AD) via the sub-bus and to output the output signal (AS) based on the output datum (AD) via the output interface and/or
to receive the input signal (ES) via the input interface and to output the input datum (ED) based on the input signal (ES) to the sub-bus,
or switch to
a second operating mode (control mode)
to receive the output datum (AD) via the sub-bus and replace the output datum (AD) by the stored output value (AW) and to output an output signal (AS) based on the stored output value (AW) via the output interface (42) and/or to output the stored input value (EW) to the sub-bus.

According to an advantageous further development, the input interface and/or the output interface comprise at least one driver circuit. The driver circuit supplies power to the input interface and/or the output interface.

Advantageously, the driver circuits are set up in such a way that they can detect errors such as short circuits, line breaks, overvoltage, undervoltage as well as currents at the input interface and/or output interface that are too high or too low and assign them to the current state of the input interface and/or output interface.

The data interface can comprise a receiver and a transmitter or a combination thereof. This so-called transceiver is set up to transmit an input and/or output datum. For the transmission of the input datum to the sub-bus, the data interface is advantageously set up to prepare the input datum on the sub-bus for forwarding.

For this purpose, the input datum can be integrated into a data packet to meet the requirements of the sub-bus. In addition to the input datum, the data packet contains further information, such as address information and parameters for transmission (e.g., CRC=Cyclic Redundancy Check–checksums). Advantageously, the output datum is extracted from a data packet by the sub-bus for forwarding to the output interface.

The I/O module can have a memory, wherein the memory is set up in such a way that it stores the input datum and the output datum as well as software to be executed, for example a firmware and parameters for the operation of the I/O module. In addition to filter times, conversion factors or variables for certain function calls, other parameters can also be the control value required to switch the operating mode.

The control unit can be connected to the data interface and to the input interface and/or output interface and is set up to process the input datum and/or output datum and exchange these via the data interface, wherein the control unit stores a predetermined input value and/or output value replacing the input datum and/or output datum in its memory or in a memory accessible by the control unit. The storage of the input value and/or output value is preferably carried out during a configuration routine in which the input value and/or output value is transmitted via the sub-bus and stored in the memory of the I/O module.

The control unit can further comprise a controller for controlling the driver circuits for converting the input datum and/or output datum into electrical voltages and currents and vice versa, for example by means of corresponding analog/digital converters or digital/analog converters.

The control unit can comprise a processor, wherein the processor is set up as a function of the control value to read out the input datum based on the input signal from the memory of the I/O module and overwrite it with an input value, wherein the input signal is converted into an input datum with the help of an N D converter.

The control unit can comprise a processor, wherein the processor is set up as a function of the control value to read out the output datum from the memory of the I/O module, to overwrite it with an output value and to output an output signal based on the output value at the output interface, wherein the output value is converted into an output signal with the help of a D/A converter.

The control unit can have switches, in particular semiconductor switches. The switches can be controlled by the processor simultaneously, with a time delay or individually and are set up to forward the input datum or the input value to the sub-bus as well as to forward the output datum or the output value to the output interface.

The control unit of the I/O module can be set up to detect the current state of the input interface and/or the output interface and to assign a state identifier to the current state, wherein at least one state identifier indicates a deviation from normal operation.

The control unit can be set up to receive the control value via the data interface and, based on the control value, to switch the I/O module to the first operating mode (normal mode) in order to detect the current state of the input interface and/or the output interface and to output the associated state identifier to the sub-bus or to switch to the second operating mode (control mode), to initiate the state that deviates from the detected state, and to output the state identifier that is associated with the current state to the sub-bus.

The input interface and/or output interface of the I/O module can be set up for measurement or detection of values, in particular of conducted currents, applied voltages and component temperatures.

The input interface and/or output interface of the I/O module can be set up to compare the measured or recorded values with parameterizable limits, wherein the parameterizable limits are defined during a configuration procedure of the I/O module and stored in the memory.

The at least one state identifier indicating the deviation from normal operation can be defined as overshooting or undershooting of the measured or recorded values with respect to the parameterizable limit values.

Advantageously, the state identifier can be a value in the form of a number, preferably an integer value or a plain text or a combination of value and plain text and corresponds, for example, to an overvoltage, undervoltage, a short circuit or a line break, or a temperature outside a limit range.

The processor of the control unit can be set up to read out the control value cyclically from the memory of the control unit and, based on the control value, to trigger an interrupt routine of the software to switch to the first operating mode or to the second operating mode.

The input interface and/or output interface can be designed in a multi-channel manner, wherein the control unit is set up to assign an input signal to each channel of the input interface and/or assign an output signal to each channel of the output interface, to assign an input value to each channel of the input interface and/or assign an output value to each channel of the output interface and to assign, for one or more channels, to each channel of the input interface and/or each channel of the output interface in each case one state, wherein at least one state identifier (ZK) is associated with each state.

Each channel of the input interface and/or the output interface can have a driver module, wherein each driver module is set up to supply each channel of the input interface and/or the output interface with power and to detect errors such as short circuits, line breaks, overvoltage, undervoltage as well as currents that are too high or too low at each channel of the input interface and/or output interface and to assign a state to each channel of the input interface and/or output interface.

Each channel of the input interface and/or output interface can be set up to connect a sensor or an actuator.

The I/O module can be part of a device with a fieldbus head, wherein the fieldbus head comprises a fieldbus connection for connection with a fieldbus and a sub-bus connection for connection with the I/O module via a sub-bus. The fieldbus head is set up to receive the control value via the fieldbus and output it to the sub-bus and based on the control value, to switch the control unit of the I/O module to the first operating mode (normal mode) or to the second operating mode (control mode), and wherein the fieldbus head is set up to receive the state identifier (ZK) of the I/O module from the sub-bus and output it to the fieldbus.

In addition to the fieldbus head, the device can comprise a plurality of I/O modules, wherein the I/O modules are arranged in groups and are mechanically and/or electrically connectable to each other.

The fieldbus head of the device can have a fieldbus connection for connection with a fieldbus, a sub-bus connection for connection to the I/O module via a sub-bus and a service interface for connection to an engineering tool, wherein the fieldbus head is set up to receive the control value (SW) via the service interface and output it to the sub-bus and based on the control value (SW), to switch the control unit of the I/O module to the first operating mode (normal mode) or to the second operating mode (control Mode), and wherein the fieldbus head is further set up to receive the state identifier (ZK) of the I/O module from the sub-bus and to output it on a display unit of an operator computer (12).

An automation system with a device and a higher-level controller can comprise a connection interface which is set up to transmit an output datum and receive an input datum and/or state identifier via the fieldbus, wherein the higher-level controller is also set up to output the output datum on the fieldbus, based on an input datum from the fieldbus. Furthermore, the higher-level controller is set up to query the state identifier and to output the current state based on the state identifier on a display unit of an operator computer.

According to an advantageous further development for operating an I/O module, the method can comprise the following steps: Receiving a control value (SW) via a sub-bus; Evaluating the control value (SW) and based on the evaluation of the control value (SW); Starting a first operating mode (normal mode), in which an output datum (AD) is received via the sub-bus and an output signal (AS) based on the output datum (AD) is output via an output interface, and/or an input signal (ES) is received via an input interface and an input datum (ED) based on the input signal (ES) is output to the sub-bus; Starting a second operating mode (control mode), in which an output datum (AD) is replaced with a stored output value (AW) and an output signal (AS)

based on the output value (AW) is output via the output interface and/or a stored input value (EW) is output on the sub-bus.

In a further advantageous further development for operating an I/O module, the method comprises the following steps: Detecting the current state (Z) of the input interface and/or the output interface; Assigning the current state (Z) to a state identifier (ZK), wherein at least one current state (Z) indicates a deviation from normal operation; Evaluating the control value (SW) by means of the control unit and based on the evaluation of the control value (SW); Starting the first operating mode (normal mode); Output of the state identifier (ZK) of the recorded state (Z) to the sub-bus; Starting the second operating mode (control mode); Initiation of the state that represents a deviation from the recorded state (Z) and output of a stored state identifier (ZK) to the sub-bus.

According to a further advantageous development for the operation of a device with a fieldbus head and an I/O module, the method comprises the following steps: Transmission of a control value (SW) by the fieldbus head via the sub-bus; Receipt of the control value (SW) by the I/O module; Evaluation of the control value SW by the I/O module and based on the evaluation of the control value (SW); Starting a first operating mode (normal mode), in which an output datum (AD) is received via the fieldbus and an output signal (AS) based on the output datum (AD) is output via the output interface and/or an input signal (ES) is received via the input interface and an input datum (ED) based on the input signal (ES) is output to the fieldbus; Starting a second operating mode (control mode), in which an output datum (AD) is replaced by a stored output value (AW) and an output signal (AS) based on the output value is output via the output interface and/or a stored input value (EW) is output to the fieldbus (15).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

For example, an automation system has a fieldbus head and an input and/or output module (I/O module). The fieldbus head is connected to a higher-level controller via a fieldbus. For the connection of the I/O modules, a fieldbus head designed as a fieldbus coupler, or a fieldbus controller can communicatively couple the I/O modules to the fieldbus. The communication of the I/O modules with the fieldbus head is in many cases realized via a proprietary sub-bus. The fieldbus head is suitable for adapting the data to be transmitted via the sub-bus in accordance with the requirements of the fieldbus and, if necessary, to change them for a higher-level controller. For this purpose, the fieldbus head can have an application such as a control program.

In automation technology, sensors record physical quantities (e.g., of an environment) and convert them into electrical signals. The electrical signals can be transmitted to a higher-level controller (PLC) for evaluation. A processor in the controller processes the signals with the help of a control program, e.g., to control actuators that perform a process step. The process step can be a sub-process as part of an overall process. In this case, it is necessary to not only test from time to time, or cyclically, the correct transmission of the electrical signals to ensure proper functioning, but also the behavior of the process or system during commissioning, replacement, troubleshooting or malfunction. The test is carried out without interfering with the program sequence of the control program.

In automation systems, sensor signals or general input signals are picked up by input modules. The input signal is converted into an input datum in the input module, for example with the help of an analog/digital converter (ND converter) and is transmitted to a sub-bus to a fieldbus head. The input datum can be a binary-coded numerical value or a physical quantity representing the input signal. The role of the fieldbus head is, for example, to forward the input data from the sub-bus to the fieldbus, and vice versa. Here, the fieldbus head can pre-process the input data received from the sub-bus. Preprocessing can involve reordering, caching, or adjusting the input data, for example by conversion.

The fieldbus head is connected to a higher-level controller via a fieldbus. On the higher-level controller, for example, a control program is executed that generates an output datum based on an input datum. The output datum is transmitted via the fieldbus to the fieldbus head and via the sub-bus to the output module. In this case, the fieldbus head can also carry out a pre-processing of the output data. In the output module, an output signal, such as a voltage or a current, is output from the output datum with the help of a digital/analog converter (D/A converter).

In many cases, input modules have multiple input channels. Specifically, multiple sensors can be connected to one input module. The input signals of the sensors are transmitted as an input datum via the sub-bus and further via the fieldbus to the higher-level controller.

In addition, there are output modules with a plurality of output channels that can be controlled individually. On the basis of input data, output data is output from the higher-level controller and output as output signals by the output module.

Aside from the output and input modules, modules are also available which have both inputs and outputs. For the sake of simplicity, in this context, the modules are referred to as input and output modules, or I/O modules. The I/O modules can be located in the local environment of an overall process or a sub-process and are supplied with energy and data by the fieldbus head, for example. Furthermore, the I/O modules can also be mechanically connected to the fieldbus head. This is also referred to as a decentralized device.

During commissioning, troubleshooting or to ensure the proper functioning of the automation system or its components, it is desirable to test the reaction of an automation system. Since input signals that call up a certain program sequence in the higher-level controller are often not available, it may be necessary to intervene in the program flow of the control program of the higher-level controller in order to put the automation system into a certain state in order to, for example, provoke an emergency state such as an emergency stop, etc. This state is commonly called diagnostic mode or control mode, which is different from normal operating mode or normal mode. Normal operating mode or normal mode is the predominant first operating mode or the normal state of the automation system. On the other hand, the diagnostic mode or control mode rather represents the second operating state, i.e., an emergency state of the automation system.

An intervention in the program flow by changing the control program is often associated with a high effort. In many programming environments, a so-called debug mode is provided, however, it interrupts the normal program flow of the control program.

Furthermore, it is possible to generate defined signals as an input signal on the I/O module, for example by connecting a voltage source with a fixed value or a switching element to the I/O module to simulate specific sensors signals. However, this procedure generally leads to rewiring of the I/O modules and is also error-prone and time-consuming.

Figure 1:
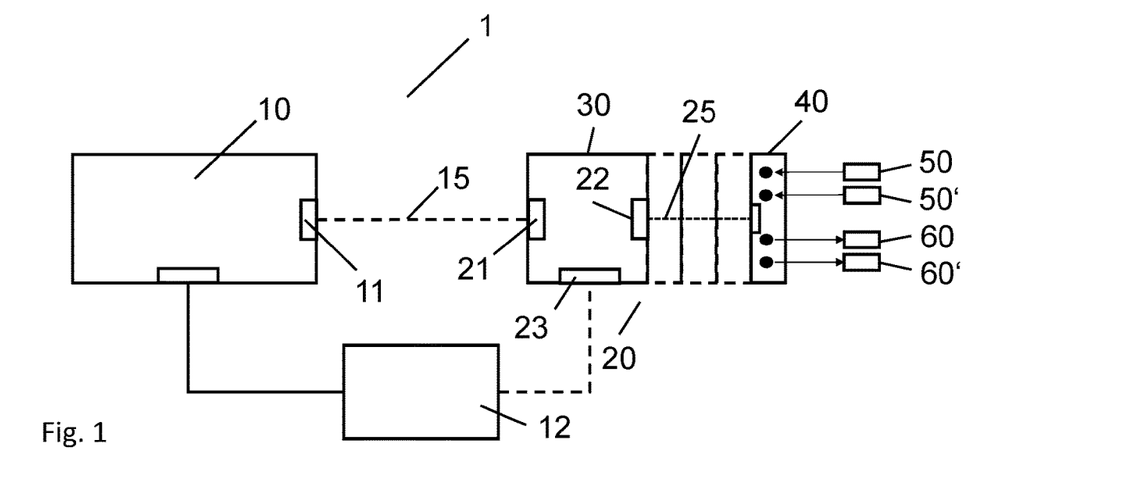
FIG. 1 is a block diagram of an automation system with a decentralized device to which, for example, sensors and actuators are connected.

FIG. 1 shows an automation system 1 with a higher-level controller 10 and a decentralized device 20. The higher-level controller 1 is connected by a connection point 11 via a fieldbus 15 to the decentralized device 20. The decentralized device 20 consists of a fieldbus head 30 and at least one I/O module 40. The I/O module 40 is preferably mechanically connected to the fieldbus head 30. The electrical supply of the I/O module 40 with energy and its transfer of data is provided by the fieldbus head 30. The data transfer from the fieldbus head 30 to the I/O module 40 and from the I/O module 40 to the fieldbus head 30 is controlled by a sub-bus 25, which is preferably controlled by the fieldbus head 30. For example, the I/O module 40 has options for connecting sensors (50, 50'), actuators (60.60'). However, protective devices and power feeds can also be connected to the I/O module.

An operator computer 12 is used to program or configure the automation system 12. The operator computer is connected with the higher-level controller 10 or with the decentralized device 20 via a service interface 23, which is designed, for example, as a USB interface. The decentralized design has the advantage that a reaction of the automation system, in particular of the connected actuators (60, 60'), can be monitored on site by the operator.

Figure 2:
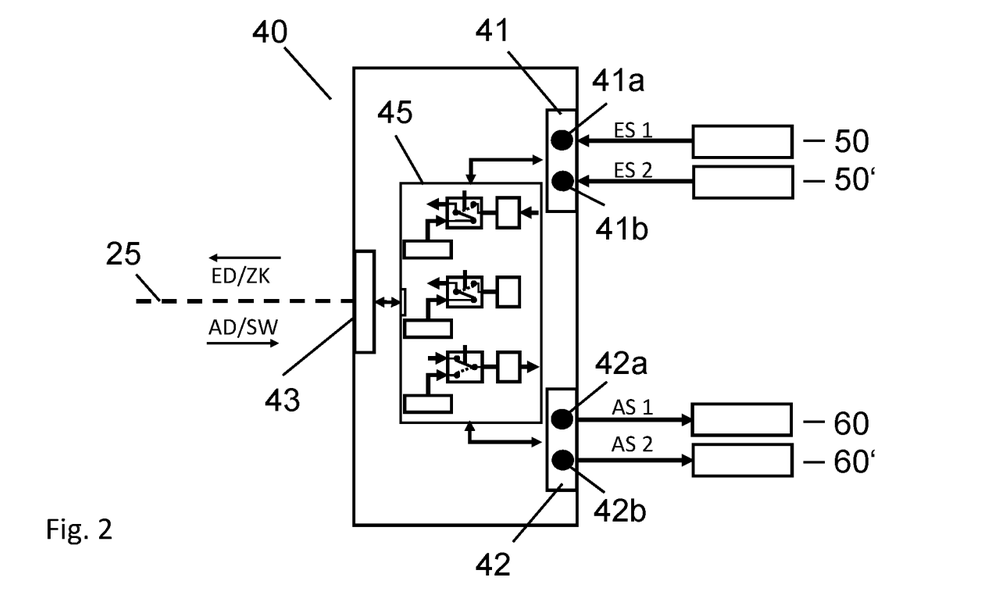
FIG. 2 is a block diagram of an I/O module according to the invention with a data interface for data connection with a sub-bus and input interfaces and output interfaces for connecting sensors and actuators.

FIG. 2 shows an I/O module 40 according to the invention. The I/O module 40 has a data interface 43 for transmitting data to a sub-bus 25. The data to be transmitted can be input data (ED), output data (AD) or control values (SW). Furthermore, data for storage in the control unit of the I/O module can also be transmitted. In addition to the input values ($EW_1$, $EW_2$, . . . ), output values ($AW_1$, $AW_2$, . . . ) or state identifiers ($ZK_1$, $ZK_2$, . . . ) this also includes data for parameterizing the I/O module, such as filter data, filter times, gain factors (offset and gain), and diagnostic data with, for example, a state identifier ZK of the I/O module 40 and/or the input interface 41 and/or the output interface 42. The storage of the data, in particular of the input and output values in the module, has the advantage in the present embodiment that it can already be processed within the I/O module, or sent to other I/O modules on the same sub-bus 25, without being affected by the head station. This results in much faster reaction times of the automation system, which are particularly important in the case of critical or failsafe systems.

The input interface 41 is set up to connect a sensor 50. Furthermore, the input interface 41 can be designed in a multi-channel manner for the connection of several sensors (50, 50'). Specifically, each sensor (50, 50') is associated with a channel (41a, 41b) of the input interface 41. In addition, the input interface 41 is set up to detect an input signal (ES1, ES2) and to forward the input signal (ES1, ES2) to the control unit 45.

The output interface 42 is set up for connecting an actuator 60. Furthermore, the output interface 42 can be designed in a multi-channel manner for connecting several actuators (60, 60'). Specifically, each actuator (60, 60') is associated with a channel (42a, 42b) of the output interface. In addition, the output interface 42 is set up for the output of an output signal (AS1, AS2) and for forwarding the output signal (AS1, AS2) for the operation of the actuator (60, 60').

The multi-channel design of the I/O modules saves valuable installation space, e.g., in a control cabinet or in a distribution cabinet.

The input interface 41 and the output interface 42 may have driver circuits with driver modules (not shown) that supply the interfaces with energy. The driver circuits advantageously have adjustable (parameterizable) current and/or voltage sources to supply energy to the interfaces and/or the sensors and/or actuators connected to the interfaces.

The driver modules are also suitable, for example, for carrying out current and/or voltage measurements to determine a current state Z of the input interface 41 or of the output interface 42. Preferably, the following states Z are conceivable: normal state, overvoltage, undervoltage, driver error, connection failure, external voltage, or short circuit, etc. The control unit 45 is set to determine the current state Z of the input interface 41 or of the output interface 42 and to assign a state identifier ZK to the determined state Z and forward it to the sub-bus 25. The state identifier is displayed to the operator computer of the higher-level controller or the fieldbus head for display or further processing and informs about the current state of the automation system.

This has the advantage that the higher-level controller or the fieldbus head can detect invalid input data by checking the state identifier ZK and, for example, prevent its further processing and protect the automation system from unwanted malfunction. An otherwise necessary and lengthy validation of the input data in the controller can be advantageously omitted by a simple check of the state identifier ZK.

Figure 3A:
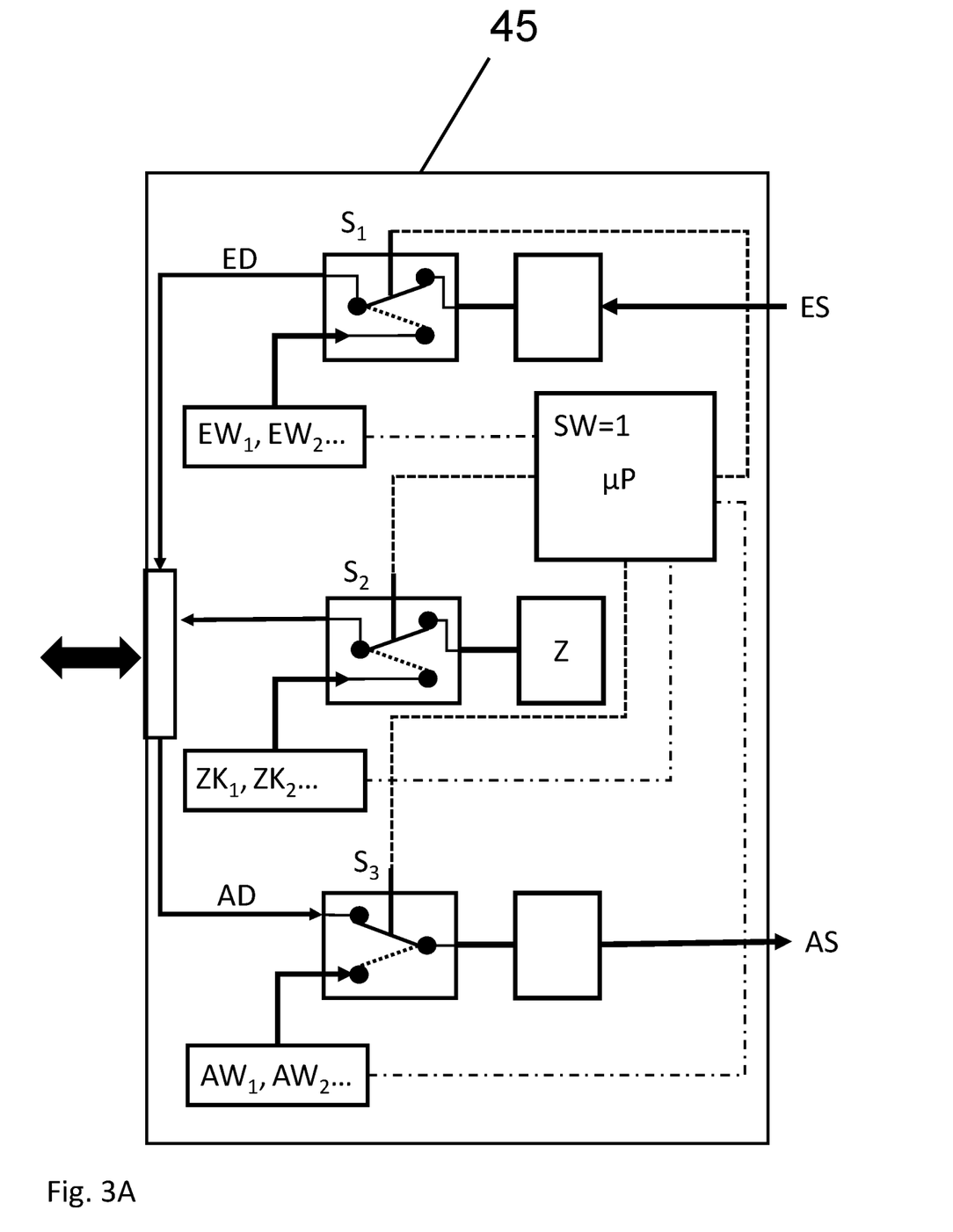
FIG. 3A is a block diagram of the control unit in a first operating mode (normal mode)
Figure 3B:
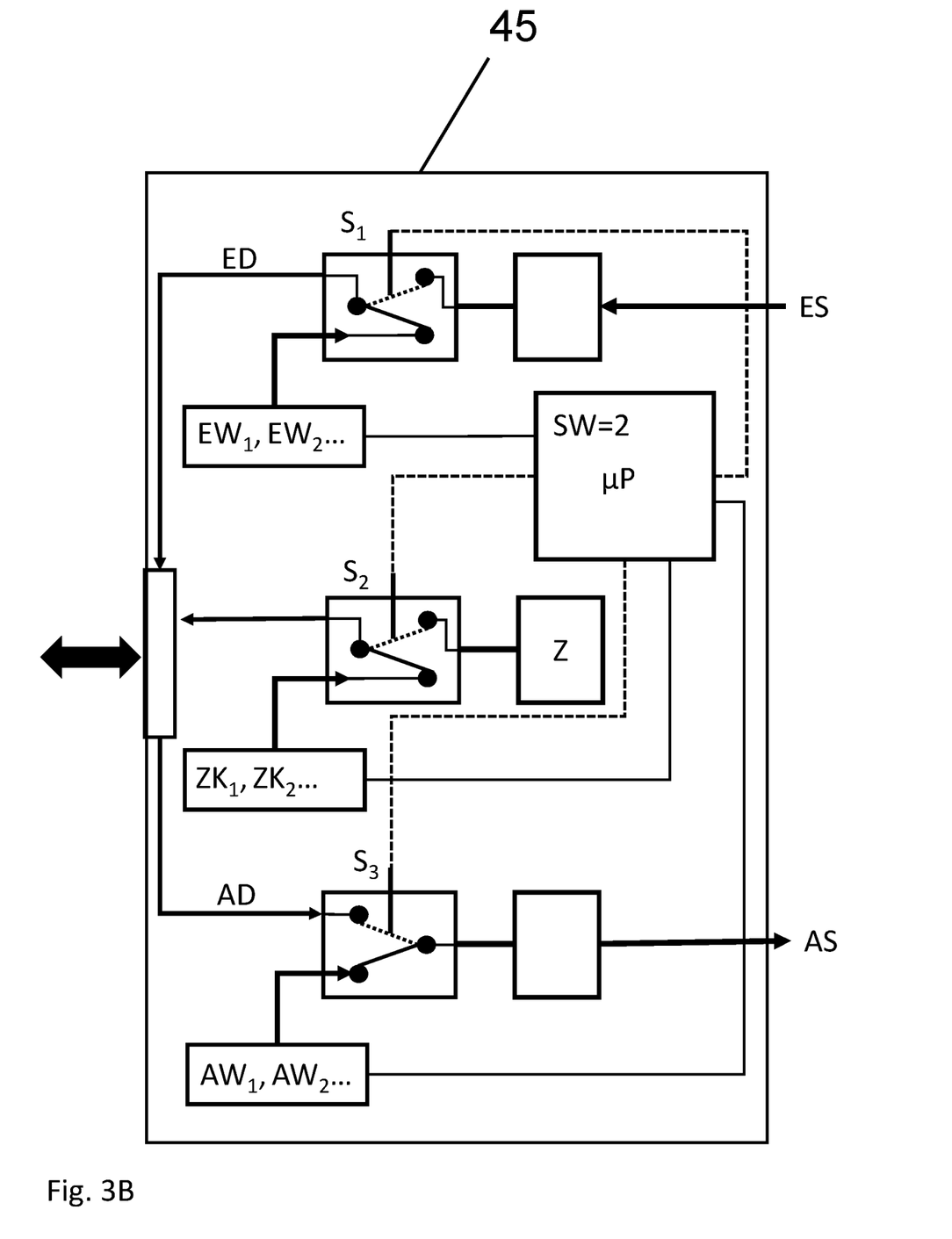
FIG. 3B is a block diagram of the control unit in a second operating mode (control mode).

FIGS. 3a and 3b show the control unit 45 of the I/O module. The control unit 45 comprises a microprocessor (µP) with components for controlling the switches $S_1$, $S_2$ and $S_3$. The switches can be designed as semiconductor switches. The switches can be controlled by the processor simultaneously, with a time delay or individually and are set up to forward the input datum or the input value or the state identifier to the sub-bus and to forward the output datum or the output value to the output interface.

The individual control of the switches $S_1$, $S_2$ and $S_3$ has the advantage, that a check of the automation system can take place separately from the direction of data transmission. For example, output values AW may be changed in the data output direction, while the data input direction continues to transmit valid input data (ED) to the controller.

Furthermore, it is also conceivable that according to an embodiment, not shown, only the input datum or the output datum is replaced or overwritten by a predetermined input value or output value. The microprocessor (μP) processes the input datum or the output datum and replaces it with an input value or output value stored in the memory. For this purpose, a firmware running on the processor can comprise further components for the conditional selection of the parameters stored in the memory, in particular the input values ($EW_1$, $EW_2$, . . . ), the output values ($AW_1$, $AW_2$, . . . ) as well as the state identifiers ($ZK_1$, $ZK_2$, . . . ). For example, by limiting the operation to an input and/or output value and a state identifier, the automation system can be checked with minimal impact.

The control unit 45 is further set up, as a function of a control value SW, to switch to a first operating mode (normal mode) with SW=1 or to a second operating mode (control mode) with SW=2.

FIG. 3*a*, for example, shows the first operating mode with SW=1. In this first operating mode (normal mode), the input signal ES is converted from the input interface 41 in the control unit 45 into an input datum ED and is output on the sub-bus 25. The conversion is carried out, for example, with the help of an analog/digital conversion device. In addition to the input datum ED, the control unit 45 is set up to output a state identifier ZK based on the current state Z on the sub-bus 25.

The input datum AD, in the first operating mode, is converted by the sub-bus in the control unit 45 to an output signal and output via the output interface 42. The conversion is carried out, for example, with the help of a digital/analog conversion device.

FIG. 3*b* shows the second operating mode with SW=2. In this second operating mode (control mode), an input value EW from the memory of the control unit 45 is output as an input datum ED to the sub-bus 25. Furthermore, the control unit 45 is set up to output a state identifier ZK stored in the memory of the control unit to the sub-bus 25.

The output datum AD from sub-bus 25 is discarded and replaced by the output value AW from the memory of the control unit 45 and is output as output signal AS via the output interface 42. In this case, the input values (EW), the output values (AW) and the state identifier ZK can be stored in the memory of the I/O module, for example when parameterizing the I/O module. It is also conceivable to carry out the parameterization during ongoing operation.

By changing and "experimenting with" the parameterization, it makes it possible to adjust the automation system more precisely. Because this takes place during operation, the reaction of the automation system to it can be determined, evaluated, and incorporated into the parameterization.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An I/O Module comprising:
    an input interface that connects to at least one sensor for input of an input signal and an output interface that connects to at least one actuator for output of an output signal;
    a data interface that connects to a sub-bus for the transmission of an input datum and output datum to and from a fieldbus head; and
    a control unit connected to the data interface and connected to the input interface and the output interface,
    wherein the control unit is set up to process the input datum and the output datum and to exchange the input datum and the output datum via the data interface,
    wherein the control unit is set up to store a predetermined input value and a predetermined output value,
    wherein the control unit is set up to receive a control value via the data interface and, based on the control value, to switch the I/O module into a first operating mode (normal mode) or into a second operating mode (control mode),
    wherein in the first operating mode (normal mode), the output datum is received via the sub-bus and the output signal is based on the output datum and is output via the output interface, and the input signal is received via the input interface and the input datum is based on the input signal and is output to the sub-bus, and
    wherein in the second operating mode (control mode), the output datum is received via the sub-bus and the output datum is replaced with the predetermined output value stored in the control unit and the output signal that is based on the predetermined output value is output via the output interface and the input datum is replaced by the predetermined input value stored in the control unit and the predetermined input value is output to the sub-bus.

2. The I/O module according to claim 1, wherein the control unit is set up to detect a current state of the input interface and/or of the output interface and to assign a state identifier to the current state, wherein at least one state identifier indicates a deviation from a normal operation, wherein the control unit is set up to receive the control value via the data interface and, based on the control value, to switch the I/O module to the first operating mode (normal mode), to detect the current state of the input interface and/or of the output interface and to output the associated state identifier to the sub-bus, or to the second operating mode (control mode) to initiate the current state that has a deviation from the detected state and to output the associated state identifier to the sub-bus.

3. The I/O module according to claim 1, wherein the input interface and/or the output interface has multiple channels, and wherein the control unit is set up to assign an input signal to each channel of the input interface and/or assign an output signal to each channel of the output interface, to assign an input value to each channel of the input interface and/or an output value to each channel of the output interface and to assign, for one or more channels, a state to each channel of the input interface and/or each channel of the output interface, wherein each state is associated with at least one state identifier.

4. A device comprising:
    the I/O module according to claim 1; and
    the fieldbus head that has a fieldbus connection that connects to a fieldbus and a sub-bus connection that connects to the I/O module via the sub-bus,
    wherein the fieldbus head is set up to receive the control value via the fieldbus and output the control value on the sub-bus, and based on the control value, to switch the control unit of the I/O module to the first operating mode (normal mode) or to the second operating mode (control mode), and
    wherein the fieldbus head is set up to receive a state identifier of the I/O module from the sub-bus and output the state identifier on the fieldbus.

5. A device comprising:
the I/O module according to claim 1; and
the fieldbus head that has a fieldbus connection that connects to a fieldbus, a sub-bus connection that connects to the I/O module via the sub-bus and a service interface that connects to an operator computer,
wherein the fieldbus head is set up to receive the control value via the service interface and output the control value on the sub-bus, and based on the control value, to switch the control unit of the I/O module to the first operating mode (normal mode) or to the second operating mode (control mode), and
wherein the fieldbus head is set up to receive a state identifier of the I/O module from the sub-bus and to output the state identifier on a display unit of the operator computer.

6. An automation system comprising:
the device according to claim 5; and
a higher-level controller with a connection interface set up to send the output datum and to receive the input datum and/or the state identifier via the fieldbus,
wherein the higher-level controller is set up to output the output datum on the fieldbus based on the input datum received from the fieldbus, and
wherein the higher-level controller is set up to query the state identifier and output a current state of the I/O module based on the state identifier to the display unit of the operator computer.

7. A method for operating an I/O module, the method comprising:
receiving a control value via a sub-bus;
evaluating the control value and based on the evaluation of the control value: (a) starting a first operating mode (normal mode), in which an output datum is received from a fieldbus head via the sub-bus and an output signal based on the output datum is output via an output interface that connects to at least one actuator and an input signal is received from at least one sensor via an input interface and an input datum based on the input signal is output to the fieldbus head via the sub-bus, and (b) starting a second operating mode (control mode), in which the output datum is replaced with a stored output value and the output signal that is based on the stored output value is output via the output interface and the input datum is replaced with a stored input value and the stored input value is output on the sub-bus.

8. The method for operating an I/O module according to claim 7, further comprising:
detecting a current state of the input interface and/or of the output interface;
assigning the current state to a state identifier, wherein at least one state indicates a deviation from a normal operation;
evaluating the control value by a control unit and based on the evaluation of the control value: starting the first operating mode (normal mode) and outputting the state identifier of the detected state to the sub-bus, or starting the second operating mode (control mode) and initiating the state that represents a deviation from the detected state and outputting a stored state identifier to the sub-bus.

9. A method for operating a device with a fieldbus head and an I/O module, the method comprising:
transmitting a control value from the fieldbus head to the I/O module via a sub-bus;
evaluating the control value, by the I/O module, and based on the evaluation of the control value:
starting a first operating mode (normal! mode), in which the I/O module receives an output datum from the fieldbus head via the sub-bus and an output signal based on the output datum is output via an output interface of the I/O module that connects to at least one actuator and the I/O module receives an input signal from a least one sensor via an input interface of the I/O module and an input datum based on the input signal is output to the fieldbus head via the sub-bus; and
starting a second operating mode (control mode), in which the output datum is replaced with a stored output value and the output signal that is based on the stored output value is output via the output interface and the input datum is replaced with a stored input value and the stored input value is output to the sub-bus.

* * * * *